United States Patent
Tzou et al.

(10) Patent No.: US 6,389,072 B1
(45) Date of Patent: *May 14, 2002

(54) MOTION ANALYSIS BASED BUFFER REGULATION SCHEME

(75) Inventors: Shing-Chi Tzou, San Jose; Zhiyong Wang; Janwun Lee, both of Mountain View, all of CA (US)

(73) Assignee: U.S. Philips Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,292

(22) Filed: Dec. 23, 1998

(51) Int. Cl.⁷ .................................................. H04N 7/12
(52) U.S. Cl. .................. 375/240; 382/236; 348/699
(58) Field of Search ............................... 348/405, 419, 348/413

(56) References Cited

U.S. PATENT DOCUMENTS

| | | | | |
|---|---|---|---|---|
| 5,309,231 A | * | 5/1994 | Hamada et al. | 348/404 |
| 5,475,433 A | * | 12/1995 | Jeong | 348/419 |
| 5,640,208 A | * | 6/1997 | Fujinami | 348/413 |
| 5,677,734 A | * | 10/1997 | Oikawa et al. | 348/405 |
| 5,732,159 A | * | 3/1998 | Jung | 382/262 |
| 5,760,836 A | * | 6/1998 | Greenfield et al. | 348/419 |
| 5,786,856 A | * | 7/1998 | Hall et al. | 348/403 |
| 5,936,671 A | * | 8/1999 | Van Beek et al. | 348/413 |
| 6,014,181 A | * | 1/2000 | Sun | 349/699 |

FOREIGN PATENT DOCUMENTS

| | | |
|---|---|---|
| EP | 0424060 | 4/1991 |
| EP | 0534504 | 3/1993 |
| EP | 541302 | 5/1993 |
| EP | 0620686 | 10/1994 |

* cited by examiner

Primary Examiner—Chris Kelley
Assistant Examiner—Shawn S. An
(74) Attorney, Agent, or Firm—Peter Verdonk

(57) ABSTRACT

A method and apparatus for processing and encoding video data is presented that allocates available bandwidth, and hence image quality, in dependence upon the relative speed of motion of objects in a sequence of images forming the video data. Fast moving objects are allocated less quality, or precision, than slower moving or stationary objects. In a preferred embodiment of this invention, the quantization step size is dependent upon the magnitude of the motion vector associated with each block in each frame of a video sequence. In a further embodiment of this invention, the quantization step size is also dependent upon the location of each block in each frame, providing more precision to a central area of each frame. To reduce computational complexity, a motion activity map is created to identify areas of higher precision based upon the location and motion associated with each block. To further reduce computational complexity in a preferred embodiment, the sets of parameters for effecting the desired quality levels are predefined, and include, for example, an initial value and bounds for the quantizing factor that is used for encoding independent and predictive frames of the sequence of images. In a further preferred embodiment, the sets of parameters for effecting the desired quality levels are adjustable based upon a user's preferences.

18 Claims, 3 Drawing Sheets

MOTION ANALYSIS BASED BUFFER REGULATION SCHEME

BACKGROUND OF THE INVENTION

1. Field of the Invention

This invention relates to the field of video image processing and data communications and in particular to the field of video image encoding.

2. Description of Related Art

Video image encoding techniques are well known in the art. Encoding standards such as CCITT H.261, CCITT H.263, and MPEG provide methods and techniques for efficiently encoding sequences of video images. These standards exploit the temporal correlation of frames in a video sequence by using a motion-compensated prediction, and exploit the spatial correlation of the frames by using a frequency transformation, such as a Discrete Cosine Transformation (DCT). When an image is transformed using a frequency transformation, the resultant frequency component coefficients, the measures of energy at each frequency, are typically non-uniformly distributed about the frequency spectrum. According to the existing standards, the non-uniformly distributed coefficients are quantized, typically producing some non-zero quantized coefficients among many zero valued quantized coefficients. The occurrences of many zero valued coefficients, and similarly valued non-zero quantized coefficients, allows for an efficient encoding, using an entropy based encoding, such as a Huffman/run-length encoding.

The aforementioned quantizing process introduces some loss of quality, or precision, in the encoding. Consider, for example, the transformation of a very minor image detail that results in a very small frequency component in the transformation of the image. If the magnitude of that frequency component, or coefficient, is below the size of the quantization step size, the quantized coefficient corresponding to that very small transformation coefficient will be zero. When the corresponding encoded image is subsequently decoded, it will not contain the original very minor image detail, because the frequency component corresponding to this detail has been eliminated by the quantization step. In like manner, each frequency coefficient is "rounded" to the value corresponding to the quantization step that includes the coefficient.

As is evident to one of ordinary skill in the art, the quantization step size determines the degree of loss of quality in the encoding process. A small quantization step size introduces less round-off error, or loss of precision, than a large quantization step size.

As is also evident to one of ordinary skill in the art, the quantization step size determines the resultant size of the entropy based encoding. A small quantization step size, for example, rounds fewer coefficients to a zero level than a large quantization step size, and therefore there will be fewer long runs of zero values that can be efficiently encoded.

A small quantization step size provides for a high quality reproduction of the original image, but at the cost of a larger sized encoding. A large quantization step size provides for a smaller sized encoding, but with a resultant loss of quality in the reproduction of the original image.

The variable sized encodings of an image are often communicated over a fixed bandwidth communications channel, such as, for example, a telephone line used for video teleconferencing, or a link to a web site containing video information. In such systems, the variable length encoded images are communicated to a buffer at the receiving site, decoded, and presented to the receiving display at a fixed image frame rate. That is, for example, in a video teleconferencing call, the sequence of images may be encoded at a rate of ten video frames per second. Because the encodings of each frame are of variable length, some frames may have an encoded length that require more than a tenth of a second to be communicated over the fixed bandwidth communications channel, while others require less than a tenth of a second. For optimal bandwidth utilization, the aggregate encoded frame transmission rate should equal the video frame rate. The receiving buffer size determines the degree of variability about this aggregate rate that can be tolerated without underflowing or overflowing the buffer. That is, if the receiving buffer underflows, a frame will not be available for display when the next period of the video frame rate occurs; if the receiving buffer overflows, the received encoding is lost, and the frame will not be displayable when the next period of the video frame rate occurs. In a conventional encoding system, the quantization step size is continually adjusted to assure that neither an overflow nor an underflow of the receiving buffer occurs. Because the receive buffer is of limited size, the quality of the encoding can become unacceptably poor, particularly when communicating via a low bandwidth communications path.

Techniques have been developed or proposed to allocate varying degrees of quality to different areas of an image, by providing different quantization step size at different regions of the image. That is, to optimize the use of available bandwidth, more bandwidth is allocated to areas of interest than to areas of less interest, by allocating a higher image quality potential to the areas of interest. U.S. Pat. No. 4,972,260, dated Nov. 20, 1990, incorporated by reference herein, provides a method of encoding that varies the quantization step size of each block in an image frame based on the location of the block in the frame; blocks in the center of the frame being assigned a smaller quantization step size, and therefore higher quality, than the blocks on the perimeter of the frame. Such a technique is based upon an assumption that the information of interest to the user will normally be centrally located on each frame. Although this assumption is commonly true, there are many situations wherein the location of an object in the scene is independent of the interest in the object. For example, videoconference scenes may include a table about which multiple participants are seated; the focus of interest will typically switch to whomever is speaking, regardless of where the speaker is located about the table.

Techniques have also been developed or proposed that analyze the image for particular features, such as areas of flesh tones, and apply a smaller quantization step size to these areas. U.S. Pat. No. 5,729,295, dated Mar. 17, 1998, incorporated by reference herein, enhances this technique by providing an encoding of an entire image, and thereafter selectively updating only the specifically identified areas and those other areas of the scene that exceed a particular motion threshold. As in the prior art, the specific areas, such as a facial area, are encoded using a smaller quantization step size than the motion areas; background areas that have slight or no movements are not encoded, thereby avoiding the encoding of "noise", such as moving leaves in a distance. Such a technique is based upon an assumption that areas of interest in the image have a distinguishable characteristic that can be used to identify the areas that are to be updated. Identifying the distinguishable characteristic in each block of each frame of a sequence of video images adds a substantial computational overhead to the encoding process. Additionally, the lack of updating of background blocks having only slight motion produces a stale and unrealistic looking background, and may result in visual anomalies, ignoring, for example, a slow but continual movement of an object across the scene.

BRIEF SUMMARY OF THE INVENTION

It is an object of this invention to provide a method and apparatus for video encoding that provides an allocation of image quality that efficiently utilizes the available bandwidth of a communications channel. It is a further object of this invention to allocate the image quality without introducing visual disturbing effects or anomalies.

These objects and others are achieved by allocating image quality in dependence upon the relative speed of motion of objects in the image. Fast moving objects are allocated less quality, or precision, than slower moving or stationary objects. In a preferred embodiment of this invention, the quantization step size is dependent upon the magnitude of the motion vector associated with each block in each frame of a video sequence. In a further embodiment of this invention, the quantization step size is also dependent upon the location of each block in each frame, providing more precision to a central area of each frame. To reduce computational complexity, a motion activity map is created to identify areas of higher precision based upon the location and motion associated with each block. To further reduce computational complexity in a preferred embodiment, the sets of parameters for effecting the desired quality levels are predefined, and include, for example, an initial value and bounds for the quantizing factor that is used for encoding independent and predictive frames of the sequence of images. In a further preferred embodiment, the sets of parameters for effecting the desired quality levels are adjustable based upon a user's preferences.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
FIG. 1 illustrates an example block diagram of a video processing system in accordance with this invention.
Figure 1:
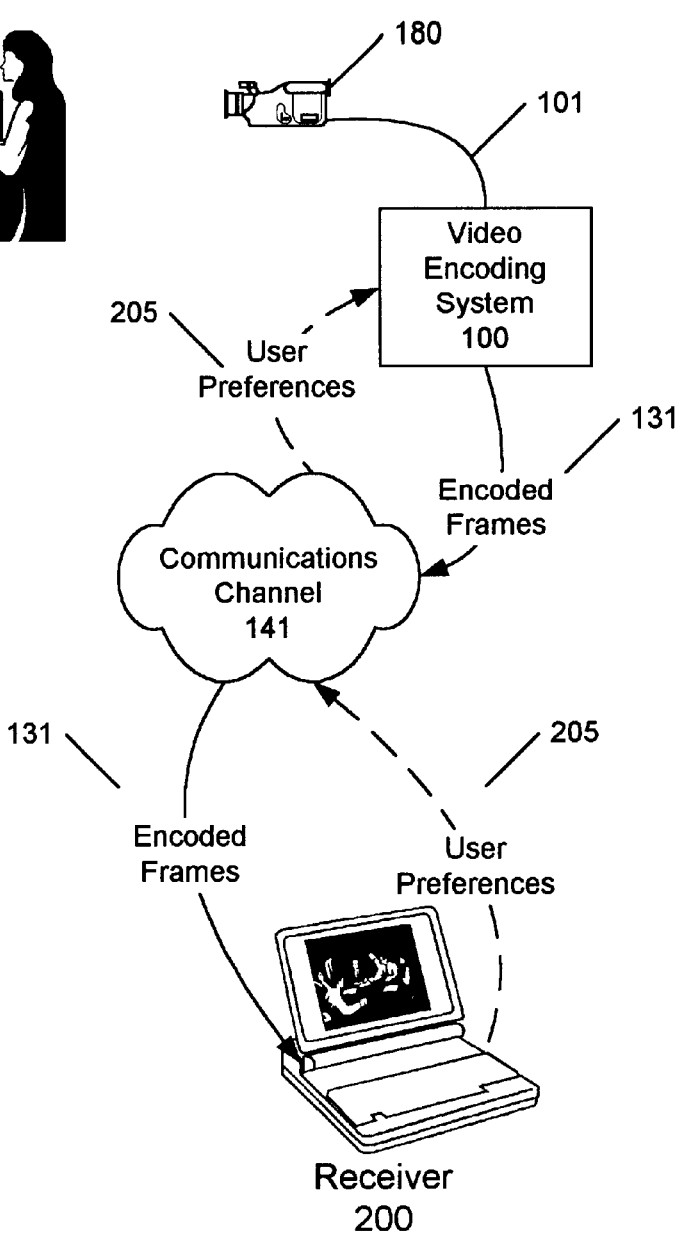

FIG. 1 illustrates an example block diagram of a video processing system in accordance with this invention, as would be used, for example, for videoconferencing. In the example of FIG. 1, a camera 180 provides video input 101 corresponding to an image scene 181 to a video encoding system 100. The encoding system 100 converts the video input 101 into encoded frames 131 suitable for communication to a receiver 200 via a communications channel 141. The communications channel 141 is represented as a communications network, such as a telephone network, although it could also be a wireless connection, a point to point connection, or combinations of varied connections between the encoding system 100 and the receiver 200. Similarly, the source of the video input 101 may be prerecorded data, computer generated data, and the like. For communications efficiency, the encoded frames 131 may contain less information than the available information at the video input 101. The performance of the video processing system is based on the degree of correspondence between the encoded frames 131 and the available video input 101.

For ease of reference the term image quality is used herein to be a measure of the accurate reproduction of an image. In a conventional video processing system, the system is configured to provide a level of image quality that is typically established by defining an acceptable video frame rate of the encoded frames 131, and then providing as much image quality as possible at that chosen frame rate. The chosen frame rate is based upon the available bandwidth of the communications channel 141 and the available buffering at the receiver 200.

As noted above, in a conventional video processing system, each frame 131 of the sequence of video images 101 is partitioned into blocks, and the allocation of available bandwidth to each block is effected by a modification of a quantizing factor that is used to quantize each block. Typically, an initial quantizing factor is provided by the video encoding system 100, and this quantizing factor is continually adjusted to avoid an underflow or overflow of a receiving buffer at the receiver 200.

As noted above, the allocation of image quality based solely upon the available bandwidth often results in a relatively poor overall image quality. It should be noted that the overall image quality will be particularly poor if there is a considerable movement of objects in the sequence of images, because a substantial portion of the available bandwidth will be consumed to convey the changes introduced to each image by these movements.

Figure 2:
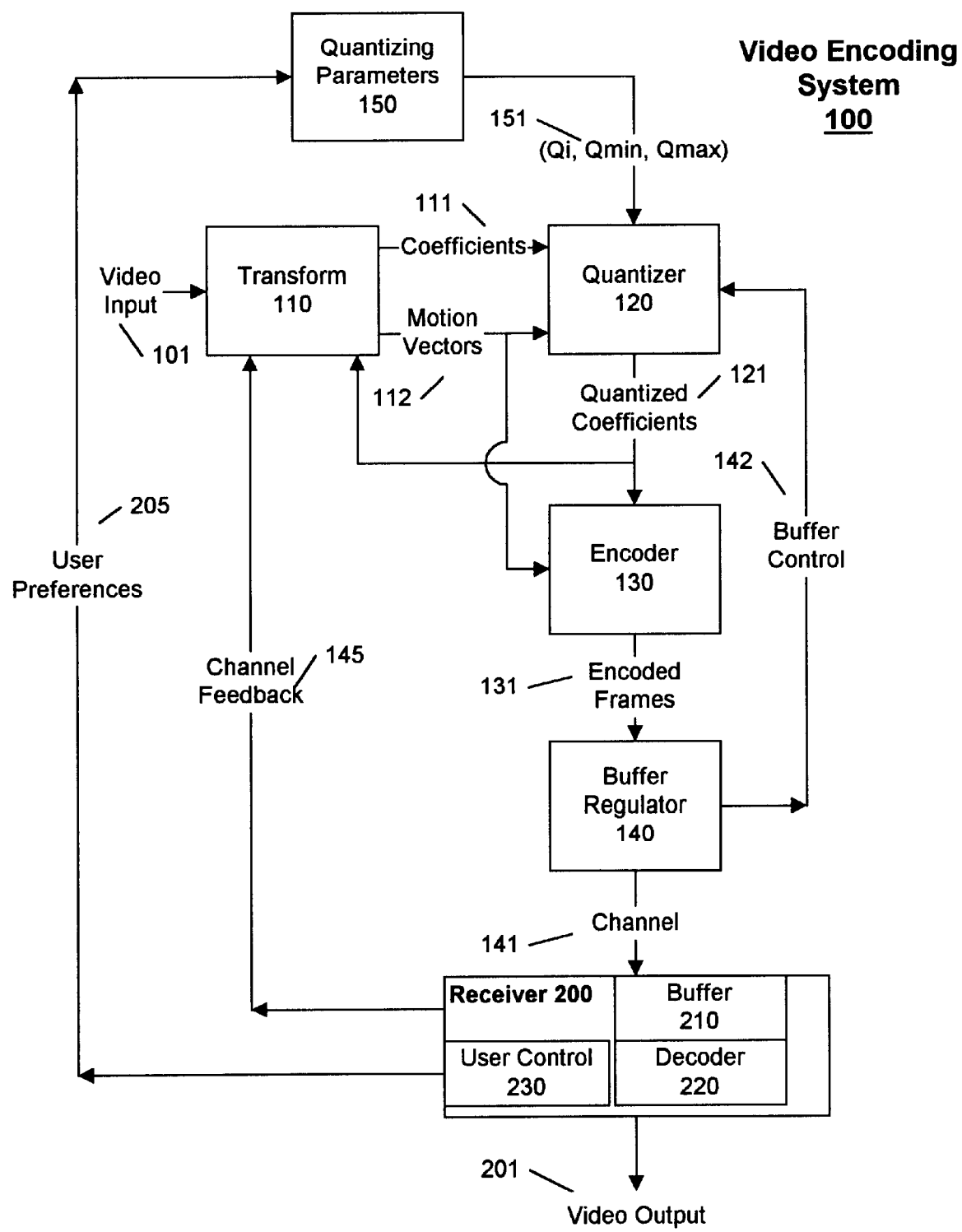
FIG. 2 illustrates an example block diagram of a video encoding system in accordance with this invention.

FIG. 2 illustrates an example block diagram of a video encoding system 100 in accordance with this invention that allocates image quality so as to provide an improvement in the overall image quality, particularly when there is considerable motion in the sequence of images. The video encoding system 100 encodes the video input 101 for communication to the receiver 200, and includes a transform device 110, a quantizer 120, an encoder 130, and a buffer regulator 140, as would be similar to a conventional video encoding system. Optionally, the video encoding system 100 also provides a source 150 of quantizing parameters 151 that affect the operation of the quantizer 120.

Video input 101, typically in the form of a sequence of image frames, is transformed by the transform device 110 to produce a set of coefficients 111 that describe the image content of each frame. As is common in the art, the transform device 110 employs a variety of techniques for efficiently coding each frame as a set of coefficients 111, the most common transformation being a frequence transformation, discussed below with regard to FIG. 3. To optimize the transmission of the coefficients 111 corresponding to the video input 101, the coefficients 111 are quantized, or rounded, by the quantizer 120. For example, the coefficients 111 may be very precise real numbers that result from a mathematical transformation of the image data, such as coefficients of the aforementioned frequency transformation. Communicating each of the bits of each of the very precise real numbers would provide for a very accurate reconstruction of the image at the receiver 200, but would also require a large number of transmitted bits via the channel 141. The quantizer 120 converts the coefficients 111 into quantized coefficients 121 having fewer bits. For example, the range of the coefficients 111 may be divided into four quartiles, wherein the quantized coefficient 121 of each coefficient 111 is merely an identification of the quartile corresponding to the coefficient 111. In such an embodiment, the quantized coefficient 121 merely requires two bits to identify the quartile, regardless of the number of bits in the coefficient 111. Consistent with commonly used terminology, the quantizing factor is the number of divisions, or quantization regions, of the range of the input parameter being quantized. The quantizing factor determines the resultant size of each quantized coefficient. In the prior example, assuming a uniform quantization step size, the quantizing factor of ¼ of the range of the input requires two bits to identify the quantized region associated with each coefficient 111; a quantizing factor of ⅛ the range of the input requires three bits, and so on. As is evident to one of ordinary skill in the art, the range of the coefficients may be divided into uniform or non-uniform sized quantization regions, and the association between a coefficient 111 value and a quantized coefficient 121 value may be linear or non-linear.

The encoder 130 encodes the quantized coefficients 121, using, in a preferred embodiment, an entropy encoding that produces different sized encodings based on the information content of the quantized coefficients 121. For example, run-length encoding techniques common in the art are employed to encode multiple sequential occurrences of the same value as the number of times that the value occurs. Because each frame of the video input 101 may contain different amounts of image information, the encoded frames 131 from the encoder 130 vary in size. Independent frames, for example, are frames that are complete and independent of other frames, and generally produce large encoded frames 131. Predictive, or inter-frames, are encoded as changes to prior frames, and generally produce smaller encoded frames 131. Because predictive frames are an encoding of changes to prior frames, the size of an encoded predictive frame will, in general, be larger when there are changes introduced by the motion of objects in the sequence of images, as compared to a relatively static sequence of images.

The encoded frames 131 are communicated to the channel 141 via the buffer regulator 140. Typically, the channel 141 is a fixed bit rate system, and the buffer regulator 140 provides the variable length encoded frames 131 to the channel 141 at the fixed bit rate. Because the encoded frames 131 are of differing lengths, the frames are communicated via the channel 141 at a varying frame rate. The receiver 200 includes a buffer 210 that stores the encoded frames 131 that are arriving at a varying frame rate and provides these frames for processing and subsequent display as video output 201 at the same fixed frame rate as the video input 101. At the receiver 200, images are reconstructed by applying the inverse of the transform, quantizing, and encoding functions of devices 110, 120, and 130, respectively, via the decoder 220.

The buffer regulator 140 is provided a measure of the size of the receiver buffer 210 and controls the amount of data that is communicated to the receiver 200 so as not to overflow or underflow this buffer 210. The buffer regulator 140 controls the amount of data that is communicated to the receiver 200 by controlling the amount of data that the quantizer 120 produces, via buffer control commands 142.

The buffer regulator 140 controls the amount of data that the quantizer 120 produces by providing a buffer control command 142 that effects a modification to the quantizing factor based on a level of fullness of the receiver buffer 210. To avoid unnecessary variations of the quantizing factor, the buffer regulator is configured to allow the quantizing factor to be within an acceptable range of values. For example, the buffer regulator 140 may specify a minimum and maximum allocated size for subsequent blocks of the current frame, from which the quantizer 120 adjusts its quantizing factor only to the degree necessary to conform. Alternatively, because the quantizer 120 can only approximate the effect that a particular quantizing factor will have on the size of the encoded frame 131 from the encoder 130, the buffer regulator 140 may merely provide an increment/decrement buffer control command 142 to the quantizer 120 as required. Upon receipt of an increment/decrement control command 142, the quantizer 120 increments/decrements the quantizing factor, respectively; absent an increment/decrement command 142, the quantizer maintains the prior value of the quantizing factor. Other techniques for modifying the quantizer factor in dependence upon a measure of the fullness of the receive buffer 210 would be evident to one of ordinary skill in the art.

In accordance with this invention, the quantizing factor is also dependent upon motion vectors 112 from the transform 110. The motion vectors 112 are estimates of movements from one frame of an image to the next. Conventionally, to minimize the amount of data associated with each frame, the transform 110 compares each frame to its prior frame to detect changes between the images that can be described as translations of objects or blocks from one frame to the next. That is, a sequence of images corresponding to a movement of a ball across a field of view can be described as a series of iterative horizontal and vertical movements of the ball, rather than repeated descriptions of the ball at each location in its path of travel. Such horizontal and vertical movements, and optionally movements in a third dimension, are termed herein as motion vectors 112. In a preferred embodiment, the quantizing factor that is used for each set of coefficients 111 is directly correlated to the magnitude of the motion vector 112. That is, faster moving objects or blocks of the image have a higher quantizing factor and are allocated less precision, or quality, than slower moving objects or blocks. Thus, in accordance with this invention, the precision of the quantized coefficients of each portion of an image frame is inversely correlated to the magnitude of the movement of that portion of the image in sequential frames. By allocating less quality, and therefore less bandwidth, to faster moving objects, which are difficult to view in detail because of their motion, more bandwidth and quality can be allocated to slower moving or stationary objects. That is, in accordance with this invention, objects or blocks that are easier to view in detail are encoded with more precision than faster moving objects.

In a preferred embodiment, each frame of an image is partitioned into an array of blocks, and the quantizer 120 contains a corresponding array of motion activity factors. Each block has an associated motion vector 112 corresponding to a translation of a similar appearing block in a prior frame to the location of the block in the current frame. The motion vector 112 reflects the horizontal and vertical translation of the block. The motion factors are assigned values based upon the magnitude of the motion vectors of each block, and could be, for example, the quantizing factor that is to be used for the quantization of the coefficients of each block. The different quantizing factors are determined heuristically, experimentally, or algorithmically, based upon the bandwidth of the channel 141, the frame size and frame rate of the video input 101, and the size of the receive buffer 210. In a preferred embodiment, the quantizing parameters 151 include a nominal initial quantizing factor Qi, and bounds Qmin and Qmax on the quantizing factor as it is adjusted by the buffer control commands 142. Typically, the nominal initial quantizing factor is a factor which, on average, provides encodings 131 that utilize the available bandwidth of the channel 141 effectively without underflowing or overflowing the receiving buffer 210. Copending U.S. patent application, "Adaptive Buffer Regulation Scheme for Bandwidth Scalability", U.S. Ser. No. 09/219,832, filed Dec. 23, 1998 presents a method and apparatus for providing quantizing parameters 151, including an option to modify the parameters based upon user preferences 205. In a preferred embodiment, the motion factors are values that are to be added or subtracted to the nominal initial quantizing factor Qi and/or the bounds Qmin and Qmax. That is, for example, slowly moving or stationary blocks have a motion factor value of −1, moderately moving blocks have a value of 0, and fast moving blocks have a value of +1, thereby providing quantizing factors of Qi−1, Qi, and Qi+1 for slow, moderate, and fast moving, respectively. Alternatively, the motion factor can be a multiplicative factor, such as *0.5, *1.0, and *2.0 corresponding to the classifications of blocks as slow, moderate, or fast moving, respectively. Addition classifications may be defined, providing more or less dependency on the magnitude of the motion vectors, as would be evident to one of ordinary skill in the art. Consistent with the prior mentioned copending application, the user preferences 205 may also affect the determination of the motion factors. That is, in this embodiment, the user control 230 in the receiver 200 allows the user to determine the degree of correlation between the motion of each block and the quantizing factor that is used to encode the block.

Figure 3:
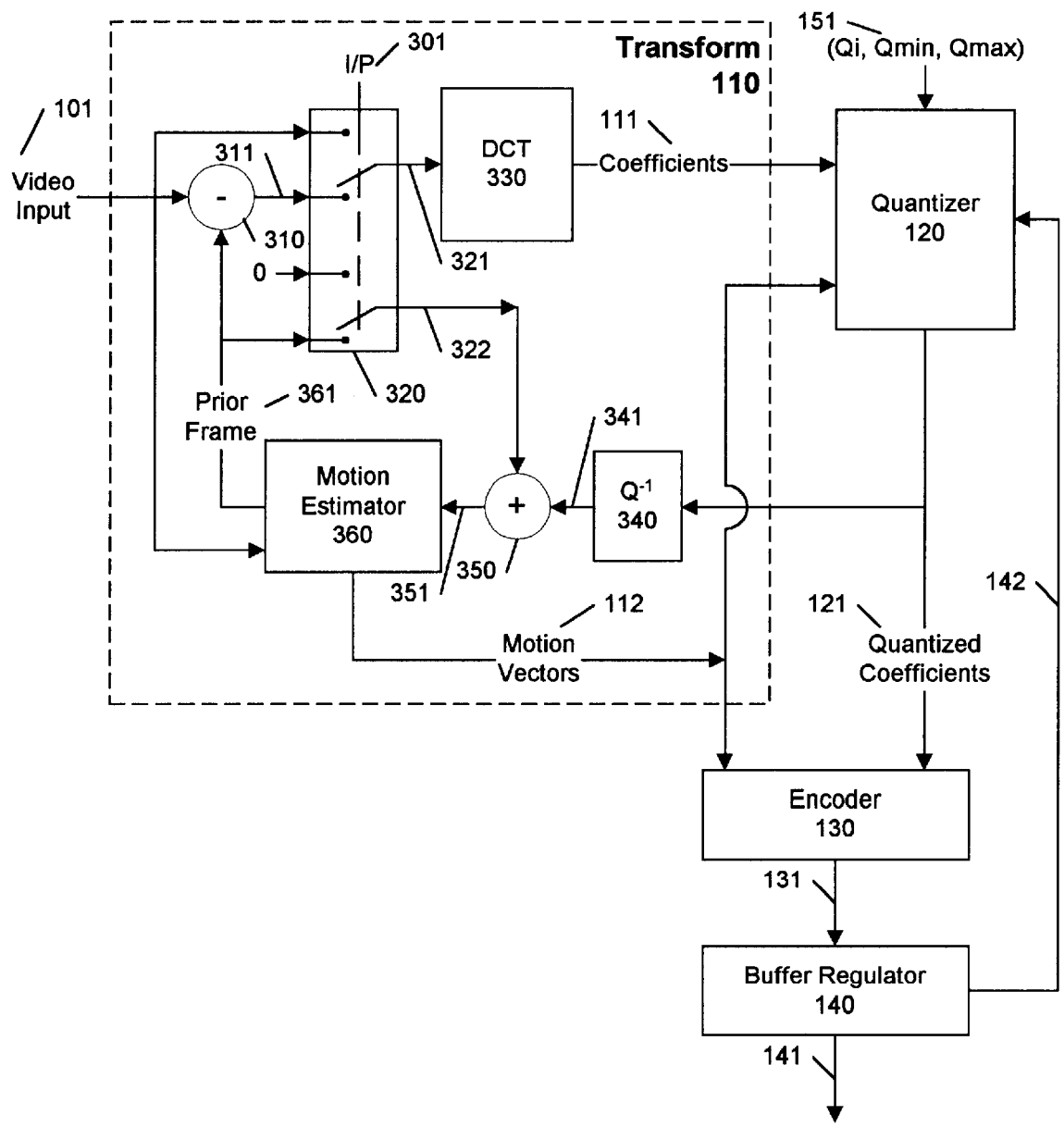
FIG. 3 illustrates an example block diagram of a transform device for use in a video encoding system in accordance with this invention.

The transform device 110 may employ any number of transformation and motion estimating techniques. For completeness, FIG. 3 illustrates an example transform device 110 for use in a preferred embodiment of this invention. In this embodiment, as in a conventional CCITT H.261, CCITT H.263, or MPEG transform device 110, a first frame of the sequence of images 101 is transformed using a Discrete Cosine Transform (DCT) 330 to provide a set of DCT coefficients 111 that correspond to the image of the first frame. This first frame is selected by the selection switch 320 having a control 301 based upon whether the frame is an independent (I) or predictive (P) frame, that directs the video input 101 for independent frames directly to the DCT 330. The coefficients 111 are quantized by the quantizer 120 to produce quantized coefficients 121. The quantizer 120 in a preferred embodiment quantizes the first frame using an initial quantizing factor that is associated with the encoding of independent frames. These quantized coefficients 121 are provided to the encoder 130 and to an inverse quantizer 340 that produces a corresponding representation 341 of the first frame 101 based on the quantized coefficients 121. An adder 350 combines this representation 341 with another output 322 of the switch 320 for input to a motion estimator 360. When an independent frame is selected by the switch 320, the output 322 of the switch 320 is null; thus, the input to the motion estimator 360 is the representation 341 of the first frame 101.

The motion estimator 360 compares a second frame of the sequence of images 101 to the representation 341 of the first frame, and transforms the differences between the frames as a set of movements of blocks in the representation 341 of the first frame to corresponding locations in the second frame. These movements are communicated as motion vectors 112 to the encoder 130 and, in accordance with this invention, to the quantizer 120, as discussed below. Differences in the details of each block between the first frame and the second frame are determined by the subtractor 310, and the differences 311 are provided to the DCT 330 by the switch 320 as error terms via 321. The DCT 330 then provides a set of DCT coefficients 111 corresponding to the differences 311. The quantizer 120 quantizes the coefficients 111 into a set of quantized coefficients 121. In accordance with this invention, the quantizer 120 uses the motion vectors 112 to determine a quantizing factor for each block, as discussed above. Blocks of the first frame that have moved a large distance to their corresponding locations in the second frame are quantized using a higher quantizing factor than those that have moved little or no distance between the first and second frames.

The quantized coefficients 121 are provided to the encoder 130 and to the inverse quantizer 340. The output 341 of the inverse quantizer 340 is a representation of the differences 311 of each block between the first and second frame. When the differences 311 are provided to the DCT 330 via the switch 320, the blocks of the prior frame (in this case the first frame) 361 is provided to the adder 350 via the switch 320. Thus, the output of the adder 350 provides a representation 351 of blocks of the second frame that is a combination of the blocks of the first frame and the differences between blocks in the first and second frames. Subsequent frames of the input sequence 101 are similarly transformed to motion vectors 112 and difference DCT coefficients 111.

The transform device 110 may effect other transformations of the video input 101, in addition to or in lieu of the example frequency tranformation presented above, using conventional or novel transformation techniques. The transform device 100 using the techniques disclosed in this copending application could transform, for example, the input 101 to a set of coefficients that describe each textured object directly, without the use of a frequency domain transformation such as the DCT, and could determine motion vectors 112 associated with each of the textured object, without the use of discrete blocks within each frame of the image sequence.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the techniques of this invention may be combined with other image quality enhancements. The aforementioned motion factors may be modified to allocate less quality to the edges of an image as well, thus providing a modification of image quality based on both motion and location. In like manner, selected areas may be identified to contain higher image quality, based on image content. Also, although the information is presented herein in the context of a video processing system, it would be evident to one of ordinary skill in the art that the principles of this invention are applicable to the processing of other data forms that employ a quantization scheme to encode the data, such that the quantization is dependent on the amount of change between elements of the input data form. The embodiments illustrated in FIGS. 1–3 are presented for illustrative purposes; alternative structures and partitions can be employed. For example, the transformation, such as DCT, provided by the transform device 110 is optional, and the transform device 110 could be replaced by a motion detection device that provides motion vectors to the quantizer 120 directly. In like manner, the video input 101 could contain an explicit coding of motion associated with the sequence of images in the video input 101. These and other encoding and optimization techniques would be evident to one of ordinary skill in the art, in view of the principles and techniques presented in this disclosure. As would also be evident to one of ordinary skill in the art, the invention disclosed herein may be embodied in hardware, software, or a combination of both.

We claim:

1. A video data processing system comprising:
an encoding system that is configured to produce an encoding of a plurality of blocks of video data corresponding to a sequence of images for communication to a receiving buffer via a communications channel, the encoding system being operative to:
transform the video data by subjecting the blocks of video data to a frequency domain coding to form a plurality of transformed blocks, and
quantize each transformed block of the plurality of transformed blocks using a quantization step that is under control of a motion activity map,
the motion activity map corresponding to a sequence of motion vectors associated with each block of the plurality of blocks of video data;
wherein
the motion activity map is
initialized to a nominal value for each block, and
subsequently modified in dependence upon the sequence of motion vectors associated with each block, so that:
the quantization step has a first value that is lower than a prior value for a first block of the transformed blocks if the first block has an associated value in the map that corresponds to relatively small motion vectors,
the quantization step has a second value that is higher than a prior value for a second block of the transformed blocks if the second block has an associated value in the map that corresponds to relatively large motion vectors, and
the quantization step is clipped to ensure that the quantization step stays between a predetermined minimum bound and a predetermined maximum bound.

2. The video data processing system of claim 1, wherein at least one of: the predetermined minimum bound, the predetermined maximum bound, and the nominal value are based on a user preference.

3. The video data processing system of claim 1, wherein the quantization step is based further on at least one of:
a measure of fullness of the receiving buffer, and
a user preference.

4. The video data processing system of claim 1, wherein the communications channel includes at least one of:
an Internet connection,
a cable connection, and
a wireless connection.

5. The video data processing system of claim 1, further including
a video camera configured to provide the data to the encoding system to facilitate the use of the processing system for videoconferencing.

6. The video data processing system of claim 5, wherein the encoding system is configured to provide the encoding of data in conformance with at least one of: a CCITT H.261 standard, a CCITT H.263 standard, and an MPEG standard.

7. The video data processing system of claim 1, wherein:
the system determines the motion activity map by assigning respective numerical motion activity values to respective ones of the blocks based on the respective motion vectors; and
the system determines a respective magnitude of the quantization step for the respective block as a function of the nominal value and the respective motion activity value.

8. The video data processing system of claim 1, further including
a buffer regulator that provides buffer control commands to modify the quantization step dependent on a fullness measure of the receiving buffer.

9. The video data processing system of claim 1, wherein the system is compatible with at least one of following encoding standards: CCITT H.261; CCITT H.263; MPEG.

10. The video data processing system of claim 1, wherein
a respective value of the quantization step is dependent on a respective location of the respective block of video data in the image.

11. The video data processing system of claim 1, wherein the system is configured to be suitable for use as a functional part of a video conferencing system.

12. A video encoding system comprising:
a transform device that is configured to transform video data blocks of a video frame into transform blocks of transform coefficients,
each transform block of the transform blocks corresponding to a respective video data block of the video data blocks,
the video frame being one of: a first type, and a second type having an associated frame of motion vectors,
a quantizer, operably coupled to the transform device, that is configured to quantize the transform coefficients of each transform block to create a corresponding quantized block frame,
each quantized coefficient of the quantized frames having a quantized value that is based on a quantization factor associated with each video data block,
a variable length encoder, operably coupled to the quantizer, that encodes the quantized block frame into an encoded frame for communication to a receiving buffer via a communications channel, and
a buffer regulator, operably coupled to the variable length encoder and the quantizer, that provides buffer control commands to the quantizer to effect a modification of the quantization factor based on a fullness measure of the receiving buffer,
wherein
the quantizer is further configured to modify the quantization factor associated with each video data block based on a motion map corresponding to the video data frame, and
the motion map is initialized to a first predetermined value at a start of the video data frame when the video data frame is of the first type,
the motion map is modified based on motion vectors associated with the video data blocks of the video data frame when the video data frame is of the second type, and
the quantization step is clipped to ensure that the quantization step stays between a predetermined minimum bound and a predetermined maximum bound.

13. The video encoding system of claim 12, wherein
at least one of: the predetermined minimum bound, the predetermined maximum bound, and the nominal value are based on a user preference.

14. The video encoding system of claim 12, wherein the quantizer is further configured to control the modification of a respective value of the quantization factor dependent on a respective location of a respective block of video data within the frame.

15. The video encoding system of claim 12, wherein the system is configured to be suitable for use as a functional part of a video conferencing system.

16. A method of processing video data, the method comprising:

encoding of the video data in blocks of an image for communication to a receiving buffer via a communications channel, the encoding comprising:

transforming the video data by subjecting the blocks of video data to a frequency domain coding;

determining a quantization step based on a motion activity map corresponding to respective motion vectors for respective ones of the blocks of video data, clipping the quantization step to ensure that the quantization step stays between a predetermined minimum bound and a predetermined maximum bound, and quantizing the transformed blocks using the quantization step;

wherein the motion activity map is initialized to a nominal value for each block, and subsequently modified in dependence upon subsequent motion vectors associated with each block, so that:

the quantization step has a first value lower than a prior value for a first block of the transformed blocks if the first block has an associated value in the map that corresponds to relatively small motion vectors, and the quantization step has a second value higher than a prior value for a second block of the transformed blocks if the second block has an associated value in the map that corresponds to relatively large motion vectors.

17. The method of claim 16, wherein the quantization step is further dependent on at least one of the following:

a measure of fullness of the receiving buffer;

a respective location of a respective one of the blocks in the image; a user-preference; and whether the image pertains to an independent frame or a predictive frame.

18. The method of claim 16, wherein the processing is practically real-time.

\* \* \* \* \*